United States Patent
Nicholas et al.

(10) Patent No.: US 10,346,381 B2
(45) Date of Patent: Jul. 9, 2019

(54) ATOMIC UPDATE OPERATIONS IN A DATA STORAGE SYSTEM

(71) Applicant: Facebook, Inc., Menlo Park, CA (US)

(72) Inventors: Deon Chris Nicholas, Kitchener (CA); Haobo Xu, Palo Alto, CA (US); Dhrubajyoti Borthakur, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 348 days.

(21) Appl. No.: 14/080,572

(22) Filed: Nov. 14, 2013

(65) Prior Publication Data
US 2015/0134602 A1 May 14, 2015

(51) Int. Cl.
*G06F 16/23* (2019.01)

(52) U.S. Cl.
CPC .......... *G06F 16/23* (2019.01); *G06F 16/2308* (2019.01); *G06F 16/2358* (2019.01)

(58) Field of Classification Search
CPC ........ G06F 17/30088; G06F 17/30368; G06F 16/2308; G06F 16/2358
See application file for complete search history.

(56) References Cited

U.S. PATENT DOCUMENTS

| | | | | |
|---|---|---|---|---|
| 5,481,699 A * | 1/1996 | Saether | ............... | G06F 11/1474 714/15 |
| 5,878,414 A * | 3/1999 | Hsiao | ............... | G06F 17/30368 707/648 |
| 5,890,154 A * | 3/1999 | Hsiao | ............... | G06F 17/30 |
| 6,192,365 B1 * | 2/2001 | Draper | ............... | G06F 9/466 707/648 |
| 6,269,413 B1 * | 7/2001 | Sherlock | ............... | G06F 3/0608 710/29 |
| 6,925,476 B1 * | 8/2005 | Multer | ............... | G06F 17/30144 707/999.2 |
| 7,117,172 B1 * | 10/2006 | Black | ............... | G06Q 40/00 705/30 |
| 8,949,180 B1 * | 2/2015 | Natanzon et al. | ............. | 707/610 |
| 9,298,760 B1 * | 3/2016 | Li | ............... | G06F 17/30321 |
| 9,367,579 B1 * | 6/2016 | Kumar | ............... | G06F 17/30371 |
| 2002/0007363 A1 * | 1/2002 | Vaitzblit | ............... | G06F 11/1471 |
| 2003/0204486 A1 * | 10/2003 | Berks et al. | ............... | 707/1 |
| 2004/0030703 A1 * | 2/2004 | Bourbonnais | ............... | G06F 17/30377 707/999.1 |

(Continued)

OTHER PUBLICATIONS

Lammel, R., "Google's MapReduce Programming Model—Revisited", 2007, Elsevier.*

(Continued)

*Primary Examiner* — Apu M Mofiz
*Assistant Examiner* — Sheryl L Holland
(74) *Attorney, Agent, or Firm* — FisherBroyles, LLP

(57) ABSTRACT

Technology is disclosed for performing atomic update operations in a storage system ("the technology"). The technology can receive an update command to update a value associated with a key stored in the storage system as a function of an input value; store the input value in a log stored at the storage system but not updating the value stored in the storage system; and update the value associated with the key with the received input values value based on the a function to generate an updated value, the updating occurring asynchronously with respect to receiving the update command.

16 Claims, 10 Drawing Sheets

(56) References Cited

U.S. PATENT DOCUMENTS

| | | | |
|---|---|---|---|
| 2006/0156064 A1* | 7/2006 | Damani et al. | 714/16 |
| 2007/0067350 A1* | 3/2007 | Dinh | G06F 17/30587 |
| 2007/0168403 A1* | 7/2007 | Meiri | G06F 11/1451 |
| | | | 707/999.204 |
| 2008/0243481 A1* | 10/2008 | Brants | G06F 17/2818 |
| | | | 704/9 |
| 2008/0256052 A1* | 10/2008 | Kar et al. | 707/5 |
| 2009/0043845 A1* | 2/2009 | Garza | G06Q 10/10 |
| | | | 709/204 |
| 2009/0177658 A1* | 7/2009 | Brantner et al. | 707/8 |
| 2009/0193039 A1* | 7/2009 | Bradley et al. | 707/100 |
| 2009/0235347 A1* | 9/2009 | Syed et al. | 726/10 |
| 2010/0257198 A1* | 10/2010 | Cohen | G06F 17/30463 |
| | | | 707/770 |
| 2011/0246503 A1* | 10/2011 | Bender et al. | 707/769 |
| 2012/0179907 A1* | 7/2012 | Byrd et al. | 713/156 |
| 2012/0278429 A1* | 11/2012 | Miura | G06F 11/2041 |
| | | | 709/217 |
| 2012/0290541 A1* | 11/2012 | Anderson | G06F 11/106 |
| | | | 707/685 |
| 2013/0145349 A1* | 6/2013 | Basak et al. | 717/121 |
| 2014/0156618 A1* | 6/2014 | Castellano | 707/703 |
| 2014/0317448 A1* | 10/2014 | Rash et al. | 714/15 |
| 2016/0110403 A1* | 4/2016 | Lomet | G06F 17/30356 |
| | | | 707/695 |

OTHER PUBLICATIONS

Balakrishnan et al., "Tango: Distributed Data Structures over a Shared Log", Nov. 6, 2013, ACM, http://dx.doi.org/10.1145/2517349.2522732.*

Sears et al., "bLSM: A General Purpose Log Structured Merge Tree", 2012, ACM.*

DeCandia et al., "Dynamo: Amazon's Highly Available Key-value Store", 2007, ACM.*

* cited by examiner

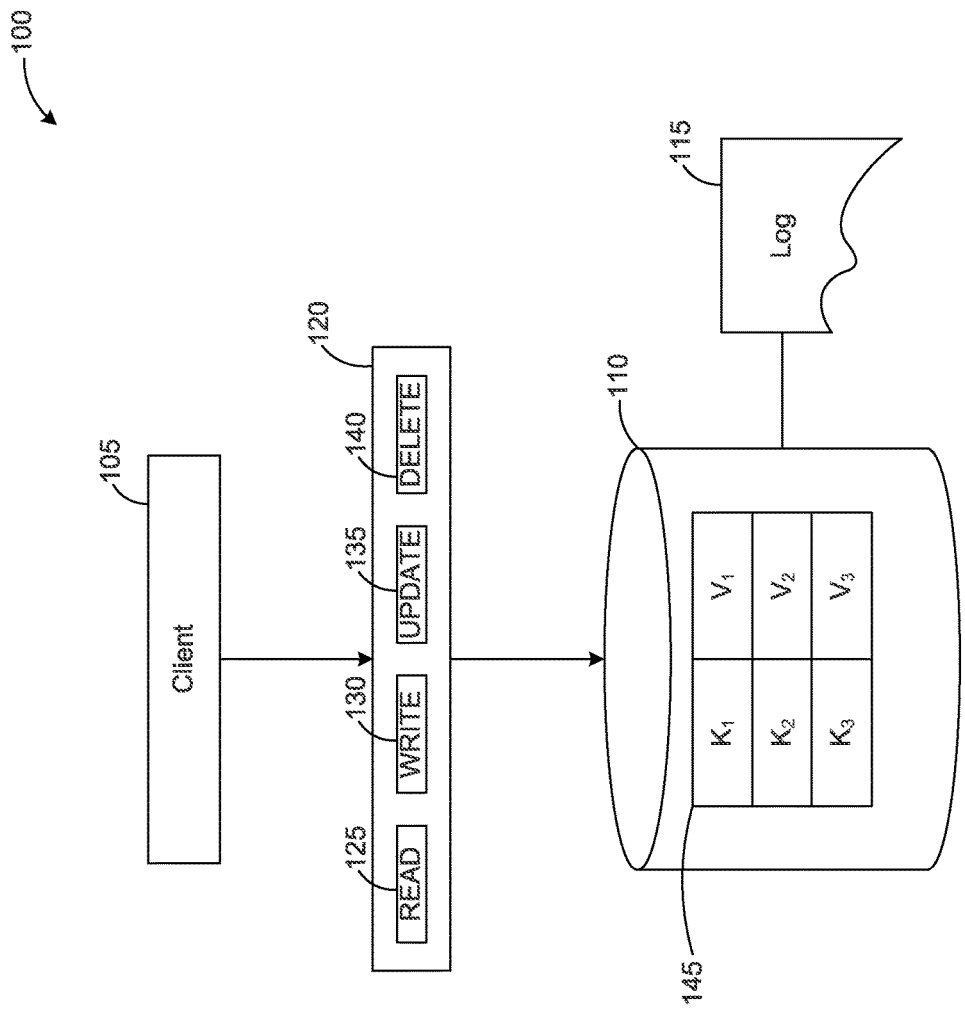

ATOMIC UPDATE OPERATIONS IN A DATA STORAGE SYSTEM

TECHNICAL FIELD

Several of the disclosed embodiments relate to data storage, and more particularly, to updating data stored in a data storage system.

BACKGROUND

Current database update techniques can be resource intensive. For example, updating a counter in the database causes the data storage system to read the value from storage into a memory location, add one to the value, write the new value back into the memory location, and then finally write the new value to storage. Thus, an update operation involves at least two input-output operations. If the counter is incremented multiple times, e.g., 1000 times, then 2000 input-output operations are performed to storage (whether memory or disk). Since the read operations can consume more time compared to the write operation, the update operation can consume significant computing resources and thereby reduce the performance of the data storage system.

Furthermore, when there is more than one process or thread incrementing the counter, a particular process or thread obtains a synchronization lock on the counter until the update is complete. However, using synchronization locks can consume significant computing resources and cause additional delays. Moreover, the source code for developing applications with synchronization locks can also become complicated and introduce errors that are difficult to troubleshoot.

BRIEF DESCRIPTION OF THE DRAWINGS

FIG. 1 illustrates an environment in which atomic update operations can be implemented in a data storage system.

DETAILED DESCRIPTION

Figure 2A:
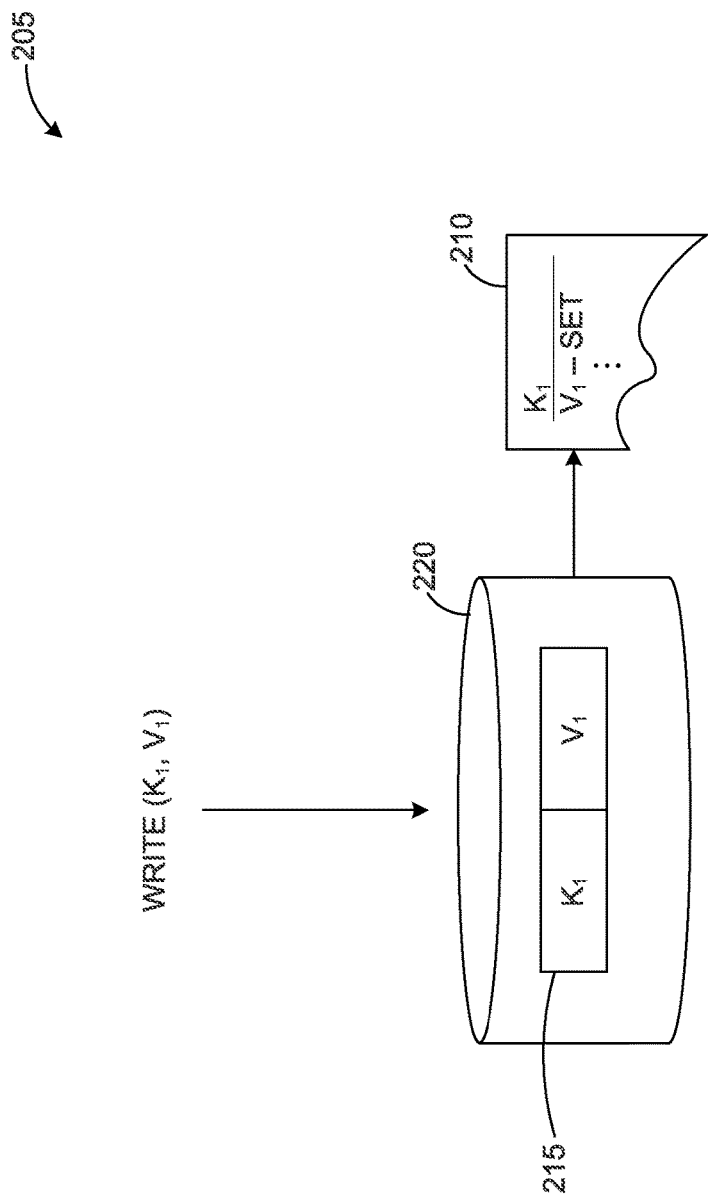
FIGS. 2A, 2B, 2C and 2D, collectively referred to as FIG. 2, are block diagrams illustrating various aspects of a system for performing update operations on data in a storage system using an update API, consistent with various embodiments of the disclosed technology.

Technology is disclosed for atomically performing update operations in a storage system ("the technology"). In an atomic update, a series of update operations all succeed or fail together. Various embodiments of the disclosed technology enable performing multiple update operations on data stored in the data storage system (also referred to herein as a "storage system") without performing an associated read operation to first read the data in response to every update operation. An update operation typically involves updating an existing value as a function of an input value to generate a new value. In some embodiments, the data to be updated is a counter and the default input value is one (or some other predefined or specified value). The input value is typically provided as an operand in the update operation. When the storage system receives update operations for particular data, the operands from the update operations are stored in the storage system. However, the storage system performs the updates to the particular data at a later point of time, e.g., when the particular data is requested by the user application or when a background process to perform these updates is scheduled to run. When the storage system applies the updates, the storage system reads all the stored operands, e.g., in a single read request to the data storage system, and updates the particular data using the stored operands. As an example, a particular post in a social network application may receive multiple "likes." The multiple likes may be stored in the data storage system as a sequence of updates to a counter. However, the counter may in fact not be updated in the data storage system until the next time the updated counter is retrieved, e.g., when a different user views the social network application post.

In some embodiments, a storage system can store data as key-value pairs. A user application can request to update a value associated with a key as a function of an input value. The storage system receives the update requests and stores the input values provided with the request. When the storage system applies the updates to the value associated with the key, the storage system reads all the input values, e.g., in a single read operation, and updates the value using the input values and based on the function.

For example, consider a key-value pair such as a counter that increments the count by "1" every time the user application requests to the update the counter value. The request for updating the counter may include a key, which can be the name of the counter and an operand "1," which can be a number that is used to update the counter. The update function can indicate how to update the existing value of the counter with the new value, e.g., "new value=existing value+input value." When several update requests are received by the storage system, the storage system stores the operand "1" from each of the requests. For example, if five update requests are received, the storage system stores the operand "1" five times. Later, when the storage system updates the counter, e.g., at a time when a user requests the counter value or when a background process updates the counter, the storage system reads all five operands "1," e.g., in a single read request, and updates the existing value of the counter by adding "1" to the counter value five times. This addition can be done in memory. This way, the number of reads performed for updating the counter five times is minimized to one read operation to the storage system. Furthermore, instead of rewriting the updated value five times to the data system, the final count can be stored to the data system only once. Accordingly, the total number of read/write operations is reduced significantly and therefore, the consumption of the computing resources is also reduced, which results in superior performance of the storage system.

In some embodiments, the storage system provides an update application programming interface (API) using which an application can issue update requests. The update request can include the key and necessary operands (input values) for updating the value of the key. The update API also enables the application to define the update function based on which the value of the key is updated. In some embodiments, a data type of the value can include an integer, a string, a linked list, a hash map, or a JavaScript Object Notation (JSON) object. The update functions can include a variety of computations on the value associated with the key, including arithmetic operations, string operations, processing of linked lists, processing of hash maps, etc.

Environment

FIG. 1 illustrates an environment in which atomic update operations can be implemented in a storage system. The environment 100 includes a client computer system 105 executing an application, e.g., a "user application" that can perform operations on a storage system 110 to read, write, update, or delete data. The client 105 can be, e.g., an Internet or "web" server and can communicate with the storage system 110 using various means, including a communication network. The storage system 110 can include a database, e.g., a Log-Structured-Merge (LSM) tree based database. An example of a LSM database is LevelDB. The storage system 110 provides an application programming interface (API) 120 for the administration of the storage system 110. In some embodiments, the API 120 can include a read API 125 for reading data from the storage system 125, a write API 130 for writing data to the storage system 110, an update API 135 for updating data in the storage system 110 and a delete API 140 for deleting data from the storage system.

An application, e.g., the user application executing on the client computer system 105, can exchange data with the storage system 110 using the API 120. In some embodiments, the storage system 110 can store data as key-value pairs 145. The storage system 110 supports storage of various data types, including integers, strings, complex data types (e.g., linked lists), hash maps, JavaScript Object Notation (JSON) data, etc. In some embodiments, the user application can serialize (e.g., convert them into a text or other format suitable for storage) at least the values associated with the corresponding keys before storing the values at the storage system 110. In some embodiments, a log file 115 stores the operations including a sequence of recent reads, writes, deletes and updates to the storage system 110. Each operation is appended to the log file 115. The log file 115 may be stored in association with the storage system 110, e.g., as part of the storage system 110. Further, in some embodiments a copy of the log file 115 may also be stored in a primary storage, e.g., a memory, of the client computer 105 which operates on the storage system 110.

In a typical update scenario, to perform an incremental update on a value associated with a key, the value is read from the storage system, updated as per the update function, and then the newly updated value is written back to the storage system. That is, an update requires at least two input/output operations—one read to read the existing value and one write to write the new resulting value. This can consume a significant amount of time and computing resources, especially if there is high number of update operations in the storage system 110, as a read operation consumes more time compared to a write operation. In some embodiments, the update API 135 allows the user application to perform a number of update operations without performing a read operation for every update operation requested by the user application.

When the user application issues update requests, input values associated with the update requests are stored at the storage system 110. As an example, value $V_1$ corresponding to key $K_1$ may be updated multiple times and stored at the storage system 110 (or, in some embodiments, in memory). In some embodiments, the input values are stored in the log 115 and, in various embodiments, in the sequence the update requests are received. However, the storage system 110 processes these updates in a "lazy" manner, e.g., at a time later than when the requests were received. For example, the storage system 110 may process the updates at a time when the user application requests the current value or at a time when a background process configured to perform the update operations is scheduled to execute. When the storage system 110 processes the updates, the update API reads the stored input values from the log 115, in a single read, and updates the existing value "$V_1$" using the input values and based on an update function defined by the user.

For example, if 1000 update requests are received for value "$V_1$," the update API 135 may store all 1000 input values associated with the requests in the log 115. When the storage system 110 performs the updates (e.g., when the current value is retrieved via the API or as part of an automated/scheduled process), the update API 135 reads the 1000 stored input values from the log 115, e.g., in one sequential read, updates the existing value "$V_1$" based on the user-defined update function, and writes the final updated value, e.g., "$V_4$" (not illustrated), in association with the key "$K_1$."

In some embodiments, the update operation consumes 1002 input-output operations (1000 write operations for writing the 1000 input values, one read operation for reading the input values from the log file, and one write operation for writing the updated value back to the storage system 110). In contrast, the prior update techniques can require 2000 input-output operations (two operations for processing for each of the 1000 update requests—one read operation for reading the existing value and one write operation for writing the updated value back to the storage system). Accordingly, the update API 135 minimizes the number of read operations significantly, thereby enhancing the performance of the storage system 110.

In some embodiments, the user application can define the update function using the update API 135. The update function can include instructions on how to update the existing value "$V_1$" using the input value specified in the update request. In some embodiments, the update function can include various types of data processing operations that can be performed for a particular data type of the value stored in the storage system 110. For example, if the data type of the value "$V_1$" is integer, one of the possible update operations can be incrementing a counter. The update function for incrementing the counter can have various instructions, e.g., "new value=existing value+input value," where "existing value"="$V_1$" and "input value"="1" or any other user application defined input value. In another example, if the data type of the value "$V_1$" is a string, one of the possible update operations can be a string concatenation operation. The string concatenation function can include instructions for concatenating existing value "$V_1$" with the string indicated by input value to generate a new string. In another example, if the data type of the value "$V_1$" is a linked list, the update function can include instructions for processing a linked list, e.g., replacing existing value of the linked list with an object indicated by the input value.

In some embodiments, the user application can configure the update API 135 to execute or use the user-defined update function to determine the updated value of the key "$K_1$" when the storage system 110 performs the update operations on the value "$V_1$." An example of performing the update operations using the update API 135 is described at least with reference to FIGS. 2A-2D.

FIGS. 2A-2D, collectively referred to as FIG. 2, are block diagrams of a system for performing update operations on data in a storage system using an update API, consistent with various embodiments of the disclosed technology. In some embodiments, the example illustrated in FIGS. 2A-2D can be implemented in an environment such as environment 100 of FIG. 1. Referring to FIG. 2A, a user application, e.g., the user application executing at the client computer 105 can read data from, write data at or update data that is stored at storage system 220.

If the user application writes a key-value pair ($K_1$, $V_1$) to the storage system 220, the write operation may initially be recorded in the log 210. In some embodiments, the write API 130 and/or another API, e.g., log API (not illustrated), that is configured to generate log files may be used to store data in the log 210. Various data can be stored in the log 210, e.g., data relating to read, write, delete, update requests, etc. Further, the data may be logged in various formats. For example, the log 210 may indicate that a key "$K_1$" was set to a value "$V_1$." Further, the value "$V_1$" may have an associated indicator, e.g., "SET," indicating that the value "$V_1$" is a set value, initial value or an absolute value of key "$K_1$" (as opposed to an intermediate value based on which the value of key "$K_1$" is determined).

Though the log 210 illustrates a "SET" indicator to indicate that a value is a set value, initial value or an absolute value of a key, various other types of indicators can be used to illustrate the same. Further, the log 210 may also store various additional information, e.g., a time when a particular request was received or performed, data regarding the user application which issued the request, etc. In some embodiments, when the requests are received at the storage system 220, data regarding the requests is appended to the log 210.

Figure 2B:
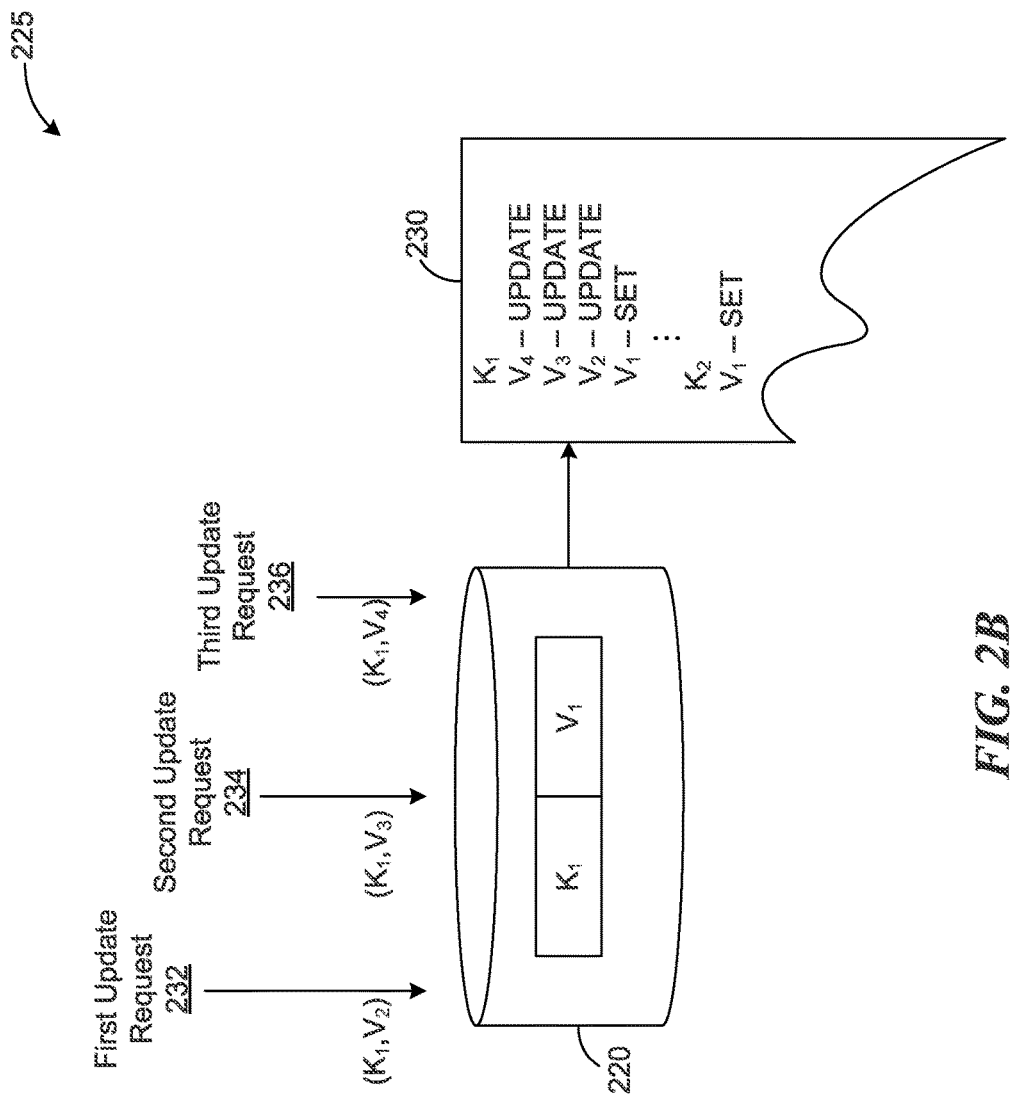

Referring to FIG. 2B, the storage system 220 receives a number of requests for updating the value "$V_1$" associated with key "$K_1$." The first request 232 requests updating the value of key "$K_1$" using input value "$V_2$." The second request 234 requests updating the value of key "$K_1$" using input value "$V_3$" and the third request 236 requests updating the value of key "$K_1$" using input value "$V_4$." In some embodiments, the update requests can be issued by the user application using the update API. The update requests can be issued at different times or at the same time. In the example in FIG. 2B, it is assumed that the requests 232, 234 and 236 are received in that order.

When the update requests are received at the storage system 220, the input values are logged into the log file 230 and the indicator of the input values are set to "UPDATE." The indicator "UPDATE" can indicate that the values "$V_2$," "$V_3$" and "$V_4$" are intermediate values based on which the final value of key "$K_1$" is determined. Though the log 230 illustrates an "UPDATE" indicator to indicate that a value is an intermediate value of a key, various other types of indicators can be used to illustrate the same. Further, the input values are appended to the log file 230 when the requests are received. In various embodiments, the data in the log 230 is stored in a chronological order or a reverse chronological order. For example, in the log 230 the data is logged in the reverse chronological order.

Figure 2C:
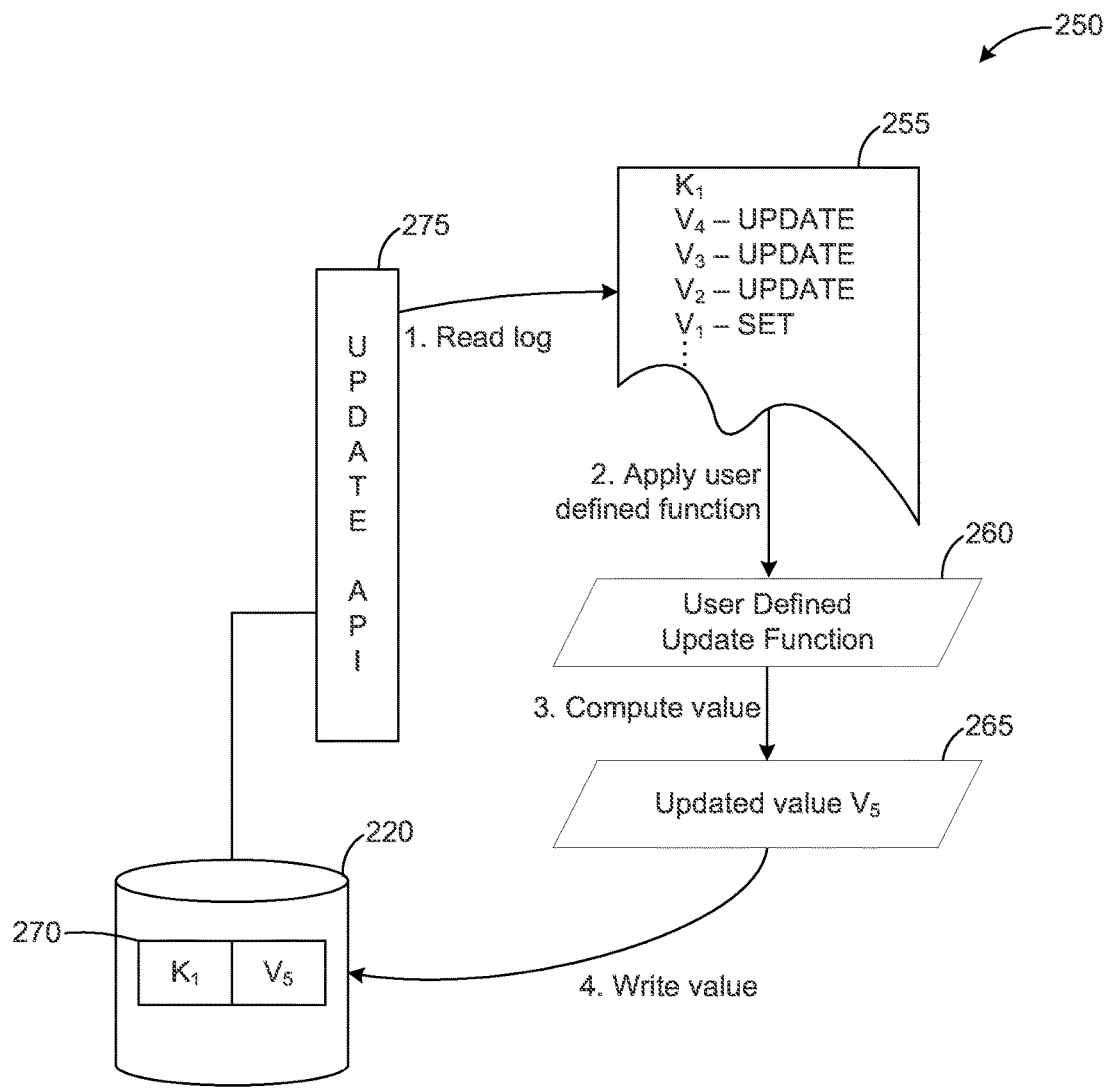
Figure 2D:
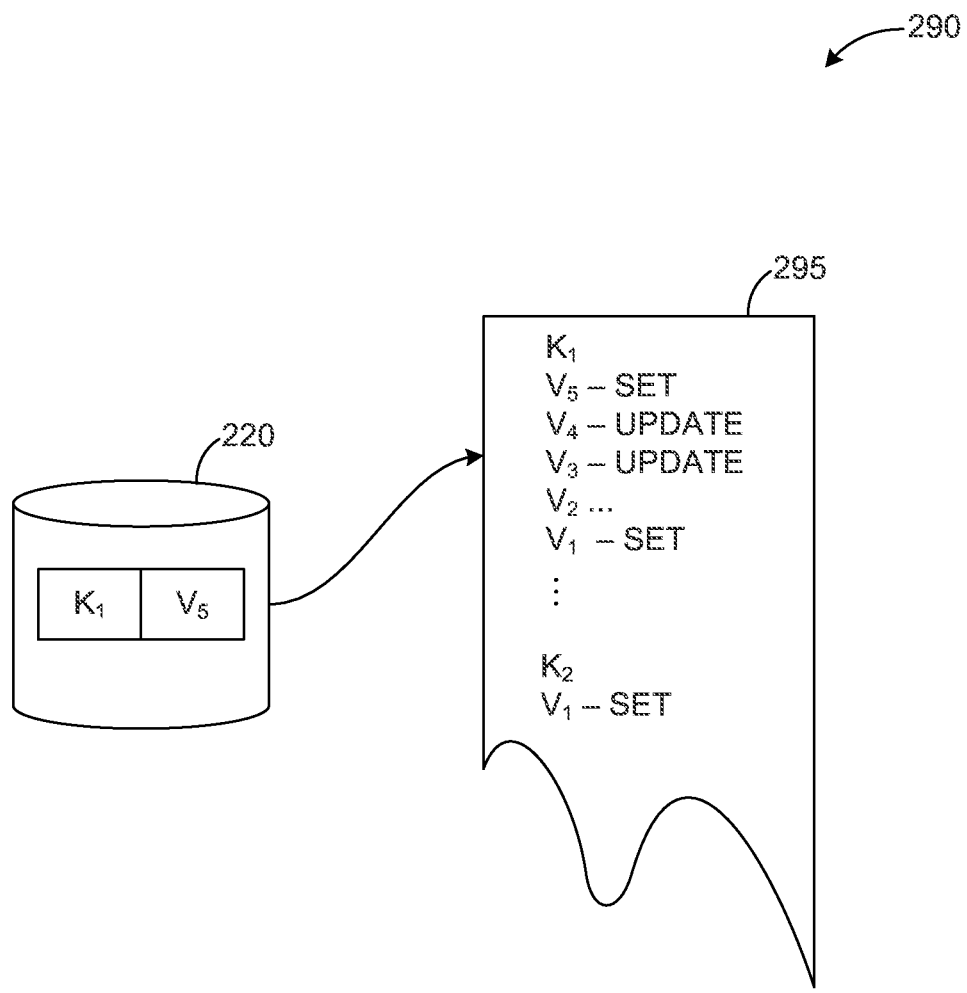

Referring to example 250 of FIG. 2C, when the storage system 220 processes the update operations 232, 234 and 236 on value "$V_1$" of the key "$K_1$," the update API reads the log file 255 to obtain the input values associated with the update operations 232, 234 and 236. In some embodiments, the update API identifies the input values to be read based on the indicator, e.g., "UPDATE," of the input values. The update API obtains all the input values that are of type "UPDATE" starting from the most recently received input value to the last time when the key "$K_1$" was set to the value "$V_1$," which is indicated by the type "SET." In the illustrated example, the update API can start reading the input values from "$V_4$" and proceed with reading input values "$V_3$" and "$V_2$" until a value "$V_1$" of type "SET" is encountered. Once a SET value is encountered, no further updates need to be processed because the SET value would reset any earlier updates or sets.

After reading the input values "$V_2$"-"$V_4$," the update API 275 updates the most recent value "$V_1$" of type "SET" using each of the input values "$V_2$"-"$V_4$" based on the user-defined update function 260 to determine the updated value "$V_5$" 265. The user-defined function 260 can be any function defined by the user application, e.g., incrementing a counter. If Key "$K_1$" is a counter name, and the value "$V_1$" is the initial or existing value of the counter "$K_1$," then the user-defined update function 260 can include instructions such as "new value=existing value+input value." The input values "$V_2$"-"$V_4$" can be a number "1" or any other number. Consider that the initial value "$V_1$" of the counter is "50" and each of the input values "$V_2$"-"$V_4$ is "1." Accordingly, the update API processes the counter identified by key "$K_1$" by adding the input value "$V_2$" to "$V_1$" ("1+50") to obtain a value "51," then adding the input value "$V_3$" ("1") to "51" to obtain a value "52" and finally adding the input value "$V_4$" ("1") to "52" to obtain an updated value "$V_5$" ("53") 265.

In another example, the user-defined function 260 can be a function for list processing, e.g., to add a location to a list of locations visited by a user. If Key "$K_1$" is a user name, and the value "$V_1$" is the initial or existing list of locations visited by the user "$K_1$," then the user-defined update function 260 can include instructions such as "new list=concatenate (existing list, input location)." The input locations "$V_2$"-"$V_4$" can be location names, e.g., name of a city, state, country, etc. Suppose the initial list of locations "$V_1$" includes "America, Canada" and the input locations "$V_2$"-"$V_4$ are "England," "China" and "India," respectively. Then, the update API 275 processes the key "$K_1$" by concatenating the input location "$V_2$" ("England") to "$V_1$" to obtain the new location list ("America, Canada, England"), then by concatenating the input value "$V_3$" ("China") to ("America, Canada, England") to get ("America, Canada, England, China"), and finally concatenating "$V_4$" ("India") to ("America, Canada, England, China") to obtain an updated value ("America, Canada, England, China, India").

The user-defined update function 260 is not limited to the above examples. Indeed, as would be recognized by one having ordinary skill in the art, the user application may define updates on various data types other than those listed herein.

After the updated value 265 is determined, the update API 275 sets the value of the key "$K_1$" to the updated value "$V_5$" as illustrated by the key-value pair 270. Further, as illustrated in example 290 of FIG. 2D, the log 295 is updated to indicate that the key "$K_1$" is set to the updated value 265 "$V_5$" and the indicator of the value "$V_5$" is set to type "SET."

In some embodiments, the above update operation consumes five input-output operations (three writes for input values, "$V_1$"-"$V_3$," one read for reading the input values from the log file and one write for writing the updated value "$V_5$" back to the storage system 220, for a total of four writes and one read). In contrast, the prior update techniques can require six input-output operations (two operations for processing each of the three update requests—one read operation for reading the existing value and one write operation for writing the updated value back to the storage system, that is a total of 3 writes and 3 reads). Accordingly, the update API 275 reduces the number of read operations, thereby enhancing the performance of the storage system 220.

In the above example, though the number of input-output operations saved is only one, the savings become significant when the number of updates is high in the storage system. As described with reference to FIG. 1, in a scenario where 1000 update requests are received, the above update operation consumes one 1002 input-output operations (1000 write operations for writing the 1000 input values, one read operation for reading the input values from the log file and one write operation for writing the updated value back to the storage system). In contrast, the prior update techniques can require 2000 input-output operations (two operations for processing for each of the 1000 update requests—one read operation for reading the existing value and one write operation for writing the updated value back to the storage system). Accordingly, the update API 275 reduces the number of read operations significantly.

In some embodiments, the disclosed technology can be useful in applications in which the number of updates to the data in the storage system is high compared to the number of reads for the data from the storage system. For example, the disclosed technology can be useful in a social networking application, e.g., for incrementing the number of "likes" received on a status or post, tracking the number of clicks received for an ad, observing the number of views of a post, etc. In a social networking application having millions of users, the number of update operations generated via clicks or likes can be significant, and therefore the savings can also be significant.

Referring back to example 250 of FIG. 2B, for processing the update requests on a key, the update API 275 obtains all the input values for the key that are of type "UPDATE" starting from the most recently received input value to the last time when the key was set to a particular value, which is indicated by the type "SET." In the example 250, the input values "$V_4$"-"$V_2$" received via requests 232, 234, and 236 are of "UPDATE" type since the requests 232, 234, and 236 are update requests. However, if, for example, the second request 234 is a request for writing or setting a value to key "$K_1$," then the value "$V_3$" can be of type "SET." Accordingly, when the update API 275 reads the log file 255 to obtain the input values for performing the updates to the key, "$K_1$," the update API 275 starts obtaining the input values that are of type "UPDATE" starting from the most recently received input value, "$V_4$," to the last time when the key was set to a value "$V_3$," that is a value of type "SET." The update API 275 processes the update operations by considering the last "SET" value, as the existing value and "UPDATE" type values that are received after the last "SET" value as input values. Accordingly, the update API 275 considers value "$V_3$," as the existing value of "$K_1$" and "$V_4$" as the input value to get the updated value 265.

Continuing with the above example, the update API may not consider the value "$V_2$" for determining the updated value "$V_5$" because the value "$V_2$" may be of no consequence for determining the updated value "$V_5$." The value "$V_2$" may be of no consequence because regardless of the new value resulting from performing an update using "$V_2$," the value of "$K_1$" is set to or overwritten with a new value "$V_3$" by a second request 234 (write request) that occurred later to the first request 232 (update request). Thus, by eliminating the processing of update operations that may be of no consequence to determining the final updated value, the consumption of the computing resources is reduced and therefore, the performance of the storage system 220 is enhanced.

Figure 3:
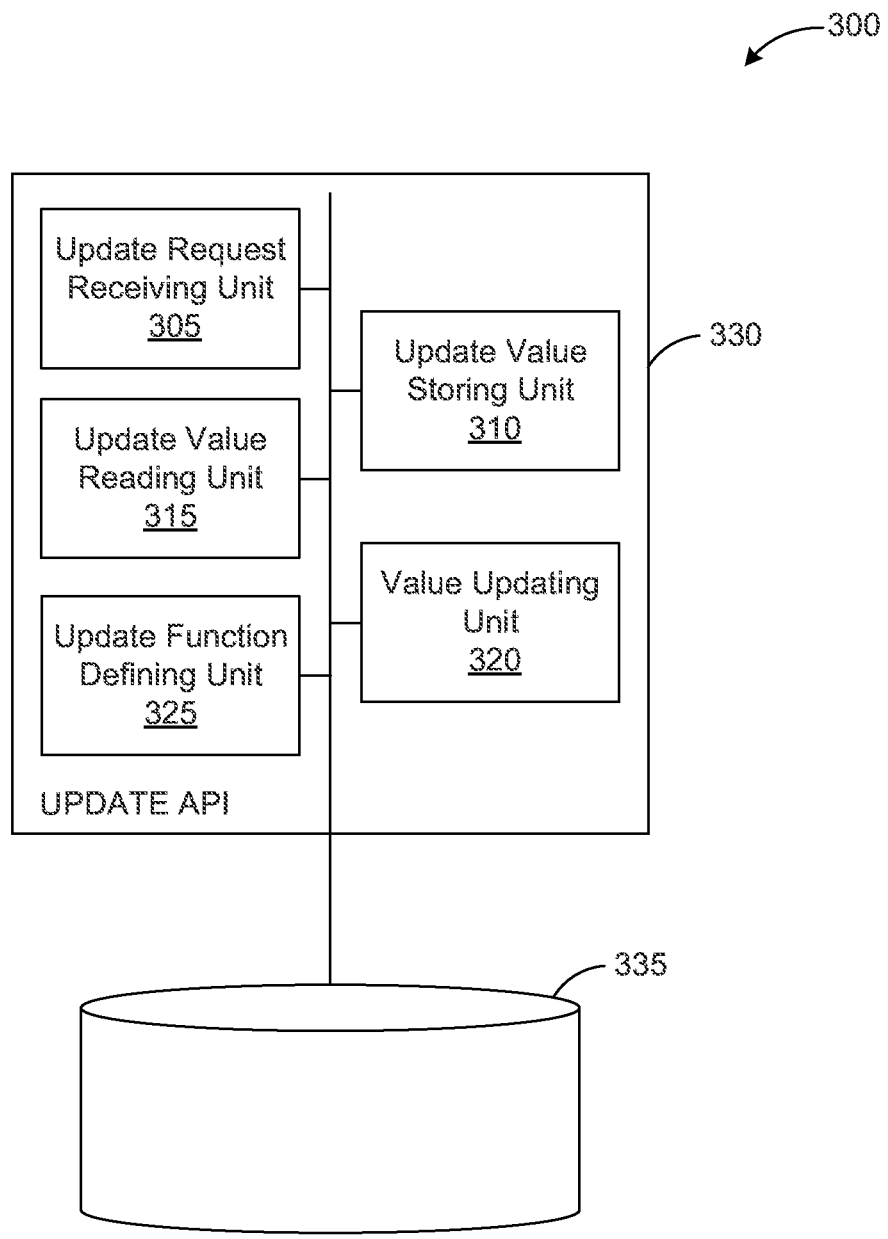
FIG. 3 is a block diagram illustrating a system for performing update operations in a storage system using an update API, consistent with various embodiments of the disclosed technology.

FIG. 3 is a block diagram of a system for performing update operations in a storage system using an update API, consistent with various embodiments of the disclosed technology. In some embodiments, the system 300 can be implemented in an environment such as environment 100 of FIG. 1. In some embodiments, the update API 330 can atomically perform update operations on data stored at a storage system 335. In some embodiments, the storage system 335 can be similar to the storage system 110 and can be a database, including LSM based database. An example of an LSM database is LevelDB.

A user application, e.g., user application executing on the client computer 105, can perform update operations on data, e.g., key-value pairs, stored in the storage system 335 using the update API 330. The update API 330 includes an update request receiving unit 305 that receives update requests from the user application. In some embodiments, an update request can include a key whose associated value has to be updated and an input value based on which the value of the key is to be updated.

The update API 330 includes an update value storing unit 310 that stores the input values provided with the update requests, e.g., update requests received by the update receiving unit 305, at the storage system 305. In some embodiments, the update value storing unit 310 also stores the input values and an indicator indicating the type of the input values, e.g., "SET", "UPDATE" etc., in a log file, e.g., log file 115. In some embodiments, the update value storing unit 310 stores the input values in the order the requests are received at the storage system 305. For example, the input values may be appended to the log file 115 as and when they are received. In some embodiments, the update value storing unit 310 can store the input values in a reverse chronological order.

The update API 330 includes an update value reading unit 315 that reads the log file 115 to identify and extract the input values necessary for performing the update operations on the key identified in the update requests. The update value reading unit 315 includes the necessary logic to identify the input values of type "UPDATE" starting from the most recently received input value up to the last time the key was set to a value, that is, a value with type "SET." In some embodiments, while the update value storing unit 310 may store the input values as and when they are received with the update requests, the update value reading unit 315 can read the log file to identify the input values required for performing the updates when the storage system 335 decides to perform the update operations on the key-value pairs.

The update API 330 includes a value updating unit 320 that performs the update operations on the key identified by the update requests. The value updating unit 320 updates the value associated with key based on the input values identified by the update value reading unit 315 and a user-defined update function. In some embodiments, the user-defined update function can be defined by the user application using the update function defining unit 325. The user-defined update function can include various types of data processing operations that can be performed for a particular data type of the value stored at the storage system 335. For example, if the data type of the value is integer, one of the possible update operations can be incrementing a counter. In another example, if the data type of the value is a string, one of the possible update operations can be a string concatenation operation. In another example, if the data type of the value is a linked list, the update function can include instructions for processing a linked list, e.g., replacing existing value of the linked list with an object indicated by the input value.

The user application can configure the value updating unit 320 of the update API 330 to execute the user-defined update function for performing the update operations on the value associated with the key. After the updated value is determined, the update value storing unit 310 may store the updated value in association with the key and update the log file accordingly to indicate that a new value has been set for the key.

Figure 4:
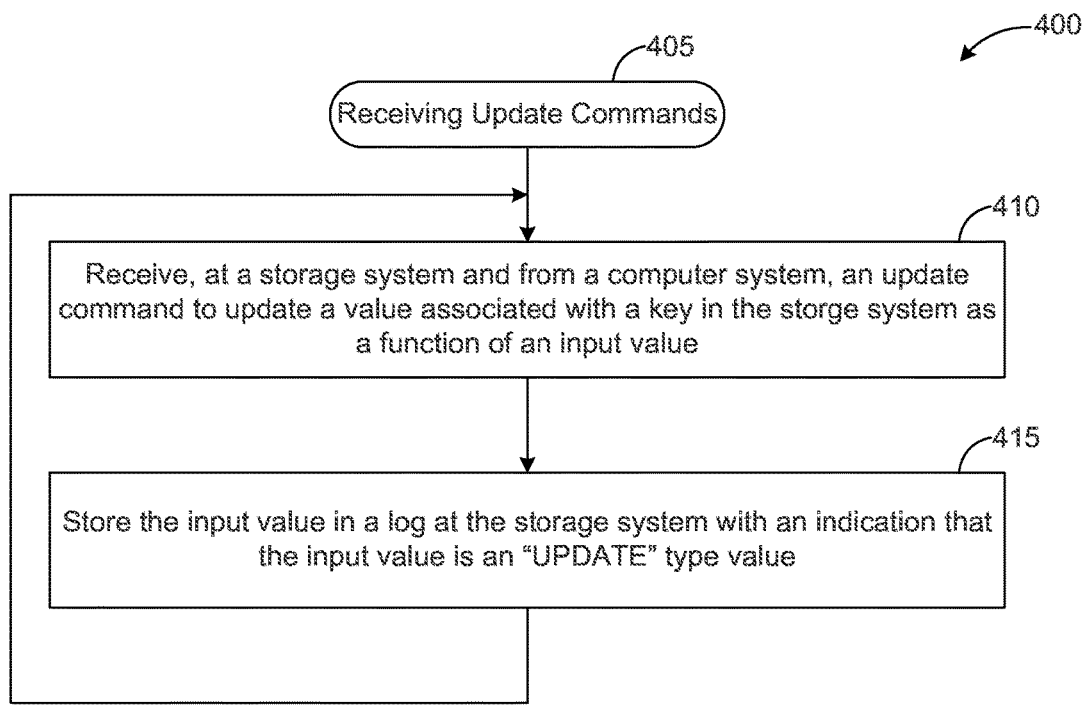
FIG. 4 is a flow diagram illustrating a process for receiving update requests at a storage system using an update API, consistent with various embodiments of the disclosed technology.

FIG. 4 is a flow diagram of a process 400 for receiving update requests at a storage system using an update API, consistent with various embodiments. The process 400 may be executed in a system such as system 300 of FIG. 3. The process 400 begins at block 405, and at block 410, the update request receiving unit 305 of the update API 330 receives an update request (or update command) to update data stored in a storage system. The update request can be received from a user application, e.g., user application executing on client computer 105 of FIG. 1. In some embodiments, the data may be stored as key-value pairs in the storage system. The request can include a key whose value is to be updated and an input value based on which the value of the key is to be updated.

At block 415, the update value storing unit 310 stores the input value in a log associated with the storage system. In some embodiments, the update value storing unit 310 stores input values received with all such update requests in the log. Accordingly, the log can include multiple input values that are received with corresponding update requests.

In some embodiments, the update value storing unit 310 also stores with the input values an indicator indicating the type of the input values, e.g., "SET", "UPDATE" etc. The indicator "SET" can indicate that a value is a set value, initialized value or an absolute value of a key in contrast to a value of type "UPDATE" which is an intermediate value based on which the value of the key is determined. In some embodiments, the update value storing unit 310 stores the input values in the order the requests are received at the storage system. For example, the input values may be appended to the log file 115 as and when they are received. In some embodiments, the update value storing unit 310 can store the input values in a reverse chronological order.

The process 400 then continues at block 410 to receive the next update request.

Figure 5:
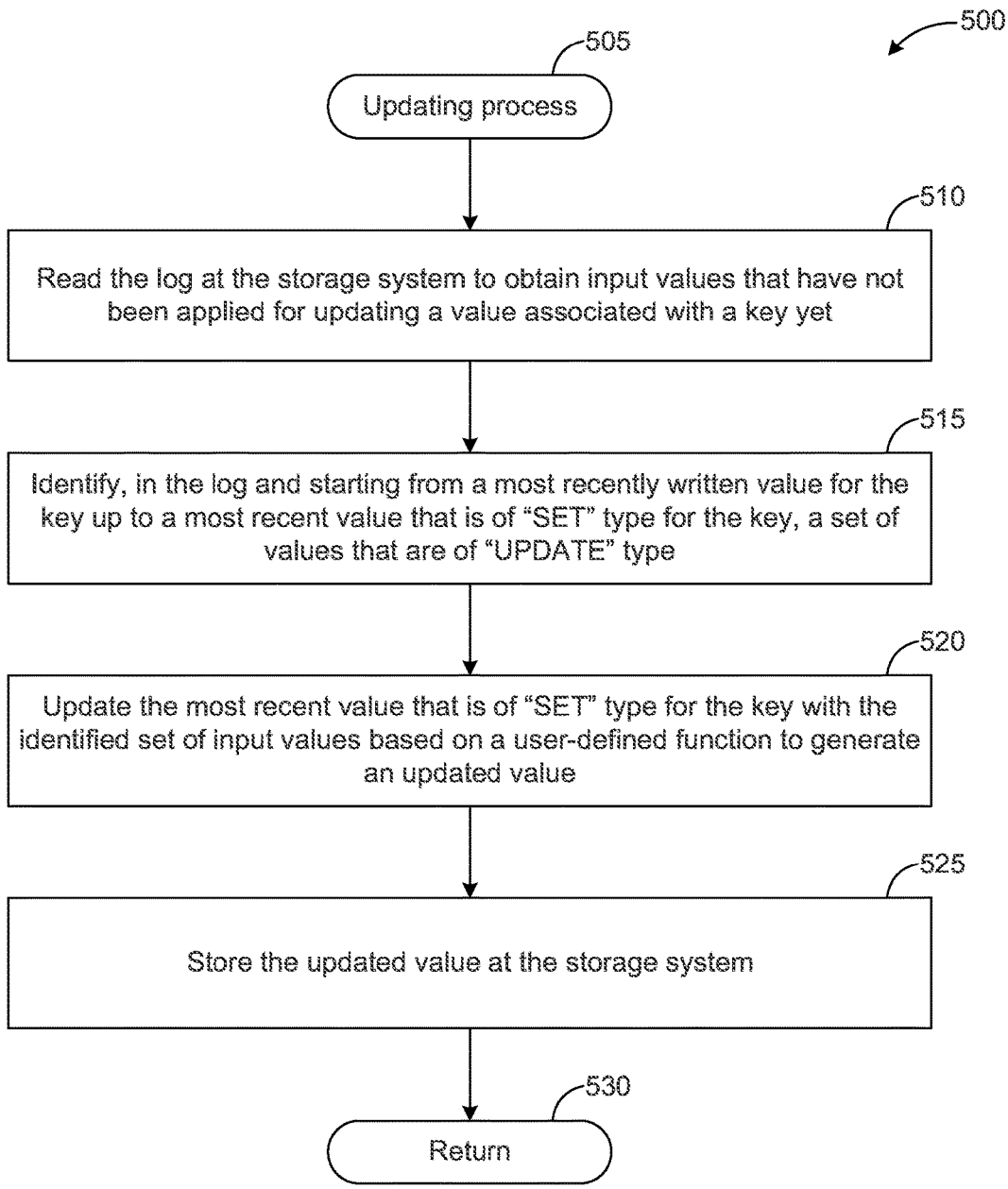
FIG. 5 is a flow diagram illustrating a process for processing update requests at a storage system using an update API, consistent with various embodiments of the disclosed technology.

FIG. 5 is a flow diagram of a process 500 for processing update requests at a storage system using an update API, consistent with various embodiments. The process 500 may be executed in a system such as system 300 of FIG. 3 for processing update requests received from a user application, e.g., user application executing on client computer 105 of FIG. 1. In some embodiments, the storage system 335 processes the update requests in a lazy manner, e.g., at a time later than when the update requests are received at the storage system 335.

The process 500 begins at block 505 and when the storage system 335 determines to process the update requests, at block 510, the update value reading unit 315 performs a read operation to read a log file associated with the storage system 335 containing input values that are received with corresponding update requests. The input values are necessary for performing the corresponding update operations on a key for which the update requests are received.

At block 515, the update value reading unit 315 identifies the input values that are necessary for processing the update requests on the key. The update value reading unit 315 includes the necessary logic to identify the input values of type "UPDATE" starting from the most recently received input value for the key up to the last time when the key was set to a value, that is, a value with type "SET."

At block 520, the value updating unit 520 updates the value associated with the key, that is, the most recent value of type "SET" of the key with the identified input values and based on a user-defined update function. The value updating unit 320 is configured to execute the user-defined update function defined by the user application. The user application may define the update function using the update function defining unit 325.

At block 525, the update value storing unit 310 stores the resulting updated value in association with the key at the storage system 335. In some embodiments, the log is also updated to indicate that the key is set to the updated value. The updated value is also associated with an indicator of type "SET" in the log. The process 500 returns at block 530.

As mentioned above, the storage system 335 can process the update requests in a lazy manner, e.g., at a time later than when the update requests are received at the storage system 335. In some embodiments, the process 500 may be performed when the user application requests to retrieve the value associated with the key. In some embodiments, the process 500 may be executed when a load on the storage system 335 is below a predefined threshold. In some embodiments, the process 500 may be executed at regular intervals, for example, when a background process is scheduled to perform the update operations. In some embodiments, the process 500 may be executed when the utilization level of computing resources are determined to be below a threshold. A background process can be a computer process that runs in the background and without user intervention. The background processes typically use minimal system resources and perform tasks which require little to no input from the user.

Figure 6:
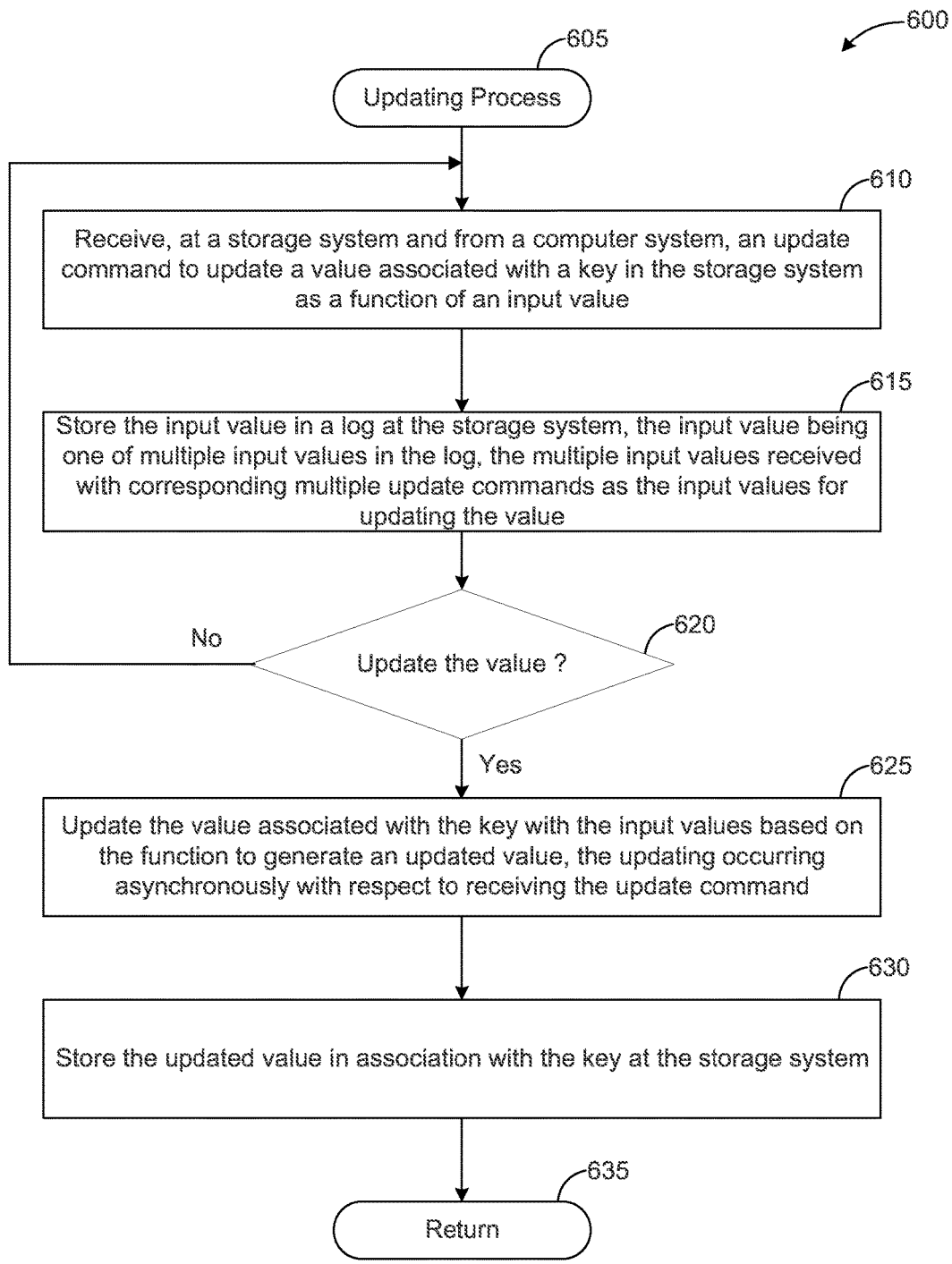
FIG. 6 is a flow diagram illustrating a process for updating data stored at a storage system using an update API, consistent with various embodiments of the disclosed technology.

FIG. 6 is a flow diagram of a process 600 for updating data stored at a storage system using an update API, consistent with various embodiments. The process 600 may be executed in a system such as system 300 of FIG. 3. The process 600 begins at block 605, and at block 610, the update request receiving unit 305 of the update API 330 receives an update request (or update command) to update key-value pairs stored in a storage system. The requests can be received from a user application, e.g., user application executing on client computer 105 of FIG. 1. The request includes a key whose value is to be updated and an input value based on which the value of the key is to be updated.

At block 615, the update value storing unit 310 stores the input value in a log at the storage system. In some embodiments, the log can include multiple input values that are received with such multiple update requests. In some embodiments, the update value storing unit 310 also stores with an input value an indicator indicating the type of the input value, e.g., "SET", "UPDATE" etc. The indicator "SET" can indicate that a value is a set value, initialized value or an absolute value of a key in contrast to a value of type "UPDATE" which is an intermediate value based on which the value of the key is determined.

In some embodiments, the storage system processes the update requests in a lazy manner or asynchronous to receiving the update requests, e.g., at a time later than when the update requests are received at the storage system. For example, the updates may be processed when the user application requests for the value associated with the key. In another example, the updates may be processed when a background process is scheduled to perform the update operations. In some embodiments, a background process is a computer process that runs in the background and without user intervention. The background processes typically use minimal system resources and perform tasks which require little to no input from the user.

At decision block 620, the update API 330 determines whether one or more criteria for processing the update requests are satisfied. In some embodiments, the criteria for processing the update requests include at least one of a receipt of a request for retrieving the value of the key or a background process configured to process the updates is scheduled to execute. If the criteria are not satisfied, the process 600 waits until the criteria are met or continues to receive the next update requests.

On the other hand, if the criteria are met, at block 625, the value updating unit 320 processes the update requests by updating the value associated with the key with the input values stored in the log and based on a user-defined update function. In some embodiments, updating the value using the multiple input values includes reading the log file to identify and extract the input values necessary for performing the update operations on the key. The update value reading unit 315 includes the necessary logic to identify the input values of type "UPDATE" starting from the most recently received input value up to the last time when the key was set to a value, that is, a value with type "SET." The identified input values are then used to update the value associated with the key based on the user-defined update function.

At block 630, the resulting updated value is stored in association with the key at the storage system. In some embodiments, the log is updated to indicate that the key is set to the updated value. The updated value is also associated with an indicator of type "SET." The process 600 returns at block 635.

Figure 7:
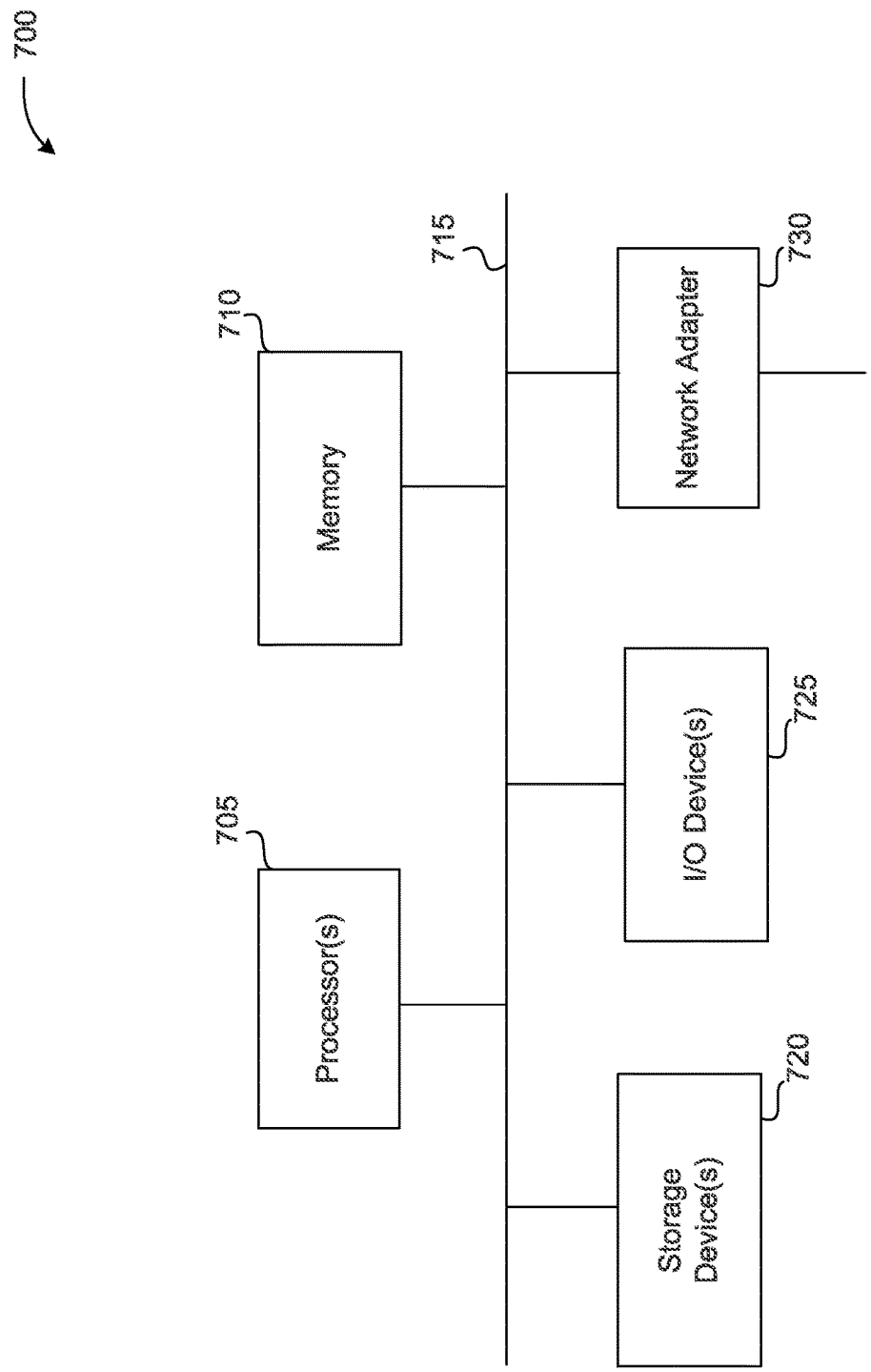
FIG. 7 is a block diagram illustrating a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the examples of FIGS. 1-6 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   receiving, at a storage system associated with a computer system, multiple update commands to update a key value of a key, the key value having a specific data type, each of the update commands including an input value using which the key value is updated, thereby creating an updated key value;
   storing, by the storage system, each of the input values in a log as and when the input values are received and without updating the key value, wherein the current key value is associated with a "SET" type indicator, and wherein each of the input values is associated with an "UPDATE" type indicator in the log indicating that the plurality of input values are to be used to update the key value upon receiving an update command, wherein the input values are stored in the log and remain unprocessed until one or more updating criteria have been met including determining that a background process configured to process the key value update is scheduled to execute;
   determining that at least one of the plurality of updating criteria has been met including determining that the background process configured to process the key value update is scheduled to execute; and
   updating the key value, by the storage system, using those input values that have "UPDATE" type indicators, wherein a user-defined function is implemented to generate the updated key value, the user-defined function being specific to the key value's data type, the updating including:
      identifying, in the log and in a single read operation, a plurality of key values that are each associated with the "UPDATE" type indicator starting from a most recently written key value up to the most recent key value associated with the "SET" type indicator, and updating, in a single write operation, the most recent "SET" type key value with the plurality of "UPDATE" type key values based on the user-defined function to generate the updated key value, and wherein the updating occurs asynchronously with respect to receiving the update commands.

2. The method of claim 1, wherein the storage system is configured to store data as key-value pairs.

3. The method of claim 1, wherein the function is defined by a user application issuing the update command.

4. The method of claim 1 further comprising:
   storing, by the storage system, the updated value in association with the key at the storage system.

5. The method of claim 4, wherein storing the updated value in association with the key includes storing, in the log, the updated value with the "SET" type indicator.

6. The method of claim 1, wherein updating the most recent value to generate the updated value of the key asynchronously with respect to receiving the update commands includes updating the most recent value associated with the "SET" type indicator with the multiple input values at a time different from when the update commands are received.

7. The method of claim 6, wherein updating the most recent value associated with the "SET" type indicator at a time different from when the update commands are received includes performing the updating by a background process of the storage system, the background process executing at the storage system independent of a process receiving the update commands.

8. The method of claim 6, wherein updating at a time different from when the update commands are received includes performing the updating in response to receiving a request at the computer system for obtaining the updated value of the key from the storage system.

9. The method of claim 8 further comprising:
   storing the updated value in association with the key at the storage system in response to performing the updating.

10. The method of claim 1, wherein the value is of a particular data type, the particular data type including at least one of an integer, a string, a linked list, a hash map, or a JavaScript Object Notation (JSON) object.

11. A non-transitory machine-readable storage medium storing machine executable instructions that, when executed by a machine, performs a method of:
    receiving, at a storage system and via an application programming interface (API) of the storage system, one or more input values and an user-defined function that are used for updating a key value of a key to generate an updated key value, the key value having a specific data type;
    storing, at the storage system, the input values in a log, wherein the current key value is associated with a "SET" type indicator, and wherein the input values are associated with an "UPDATE" type indicator indicating that the one or more input values are to be used to update the key value upon receiving an update command, wherein the input values are stored in the log and remain unprocessed until one or more updating criteria have been met including determining that a background process configured to process the key value update is scheduled to execute;
    determining that at least one of the plurality of updating criteria has been met including determining that the background process configured to process the key value update is scheduled to execute; and
    updating the key value, by the storage system, from the log, using those input values associated with the "UPDATE" type indicator, wherein a user-defined function is implemented to generate the updated key value, the user-defined function being specific to the key value's data type, wherein the updating includes:
       identifying, in the log and in a single read operation, a plurality of key values that are each associated with the "UPDATE" type indicator starting from a most recently written key value up to the most recent key value associated with the "SET" type indicator; and updating, by the storage system and in a single write operation, the most recent "SET" type key value with the plurality of "UPDATE" type key values according to the user-defined function to generate the updated key value.

12. The non-transitory machine-readable storage medium of claim 11, further comprising machine executable instructions to perform the method of:

storing the updated value in association with the key at the storage system.

13. The non-transitory machine-readable storage medium of claim 12, wherein storing the updated value in association with the key includes storing, in the log, the updated value with the "SET" type indicator.

14. A system, comprising:
an update request receiving unit, comprising a processor configured to receive an update command to update a key value as a function of an input value, the key value having a specific data type, the input value being used to determine an updated key value;
an update value storing unit, comprising a processor configured to store the input value in a log, the input value being one of multiple input values in the log, the multiple input values received with corresponding multiple update commands for updating the value of the key, wherein the current key value is associated with a "SET" type indicator, and wherein each of the input values associated with an "UPDATE" type indicator indicating that the multiple input values are to be used to update the key value upon receiving an update command, wherein the input values are stored in the log and remain unprocessed until one or more updating criteria have been met including determining that a background process configured to process the key value update is scheduled to execute;
determining that at least one of the plurality of updating criteria has been met including determining that the background process configured to process the key value update is scheduled to execute; and
a value updating unit, comprising a processor configured to:
update the key value, using the processor, with the input values based on a user-defined function to generate the updated value of the key, the updating occurring asynchronously with respect to receiving the update command, wherein the user-defined function is implemented to generate the updated key value, the user-defined function being specific to the key value's data type, wherein the value updating unit is configured to generate the updated key value by:
identifying, in the log using the processor, and in a single read operation, a set of values that is associated with the "UPDATE" type indicator starting from a most recently written key value up to the most recent key value associated with the "SET" type indicator, and
updating, in a single write operation, the most recent "SET" type key value with the plurality of "UPDATE" type key values based on the user-defined function to generate the updated key value.

15. The system of claim 14, wherein the update value storing unit is configured to store data as key-value pairs in the storage system.

16. The system of claim 14, wherein the function is defined by an application issuing the update command.

* * * * *

UNITED STATES PATENT AND TRADEMARK OFFICE
CERTIFICATE OF CORRECTION

PATENT NO. : 10,346,381 B2
APPLICATION NO. : 14/080572
DATED : July 9, 2019
INVENTOR(S) : Deon Chris Nicholas et al.

Page 1 of 1

It is certified that error appears in the above-identified patent and that said Letters Patent is hereby corrected as shown below:

On the Title Page

Item [57], Lines 8-9, delete "input values value based on the a function" and insert -- input value based on the function --, therefor.

Signed and Sealed this
Twenty-first Day of April, 2020

Andrei Iancu
*Director of the United States Patent and Trademark Office*